Dec. 22, 1970     G. W. LECOCQ     3,550,063
POLYPHASE JUNCTION BOX
Filed Aug. 14, 1968
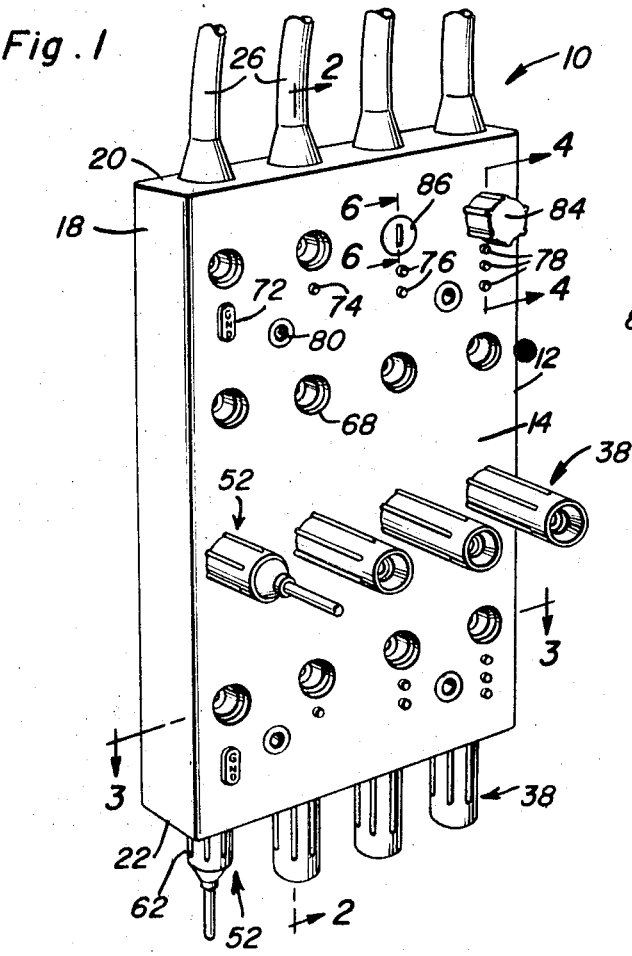
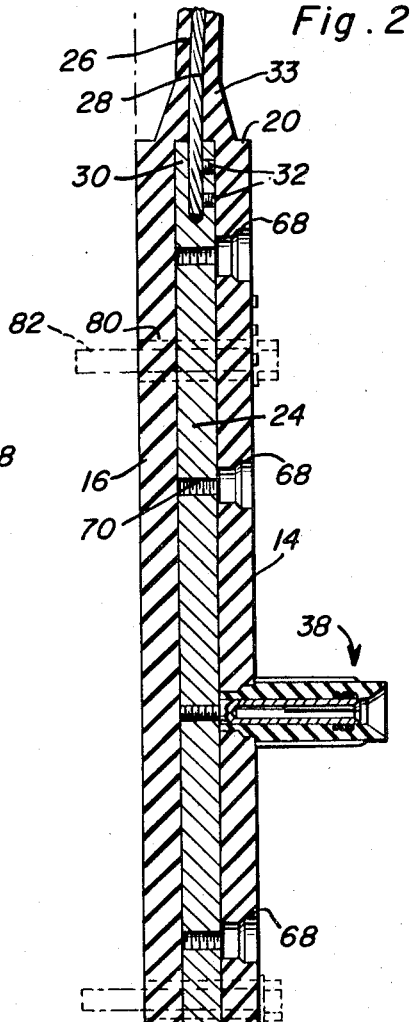
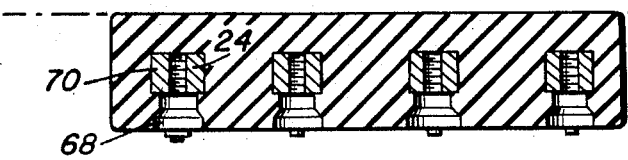
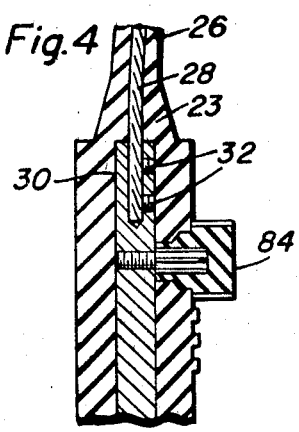
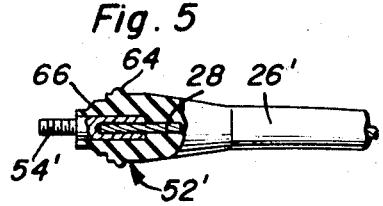
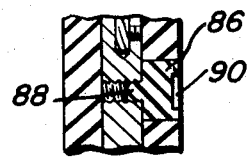
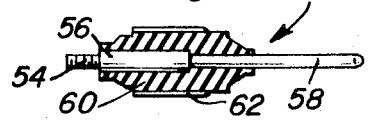
Gerald W. Lecocq
INVENTOR.

United States Patent Office 3,550,063
Patented Dec. 22, 1970

3,550,063
POLYPHASE JUNCTION BOX
Gerald W. Lecocq, West Frankfort, Ill., assignor of one-fourth each to Pleasant E. Smith, Carbondale, James A. Ozbourn, Carterville, and Thomas A. Miller, Marion, Ill.
Filed Aug. 14, 1968, Ser. No. 752,680
Int. Cl. H01r 23/00, 13/16
U.S. Cl. 339—22                                    1 Claim

ABSTRACT OF THE DISCLOSURE

A number of parallel spaced bus bars are embedded within a block of dielectric material. Each bus bar includes tapped bores therein at spaced intervals along its length. Each tapped bore is aligned with a stepped diameter opening in the dielectric block. A number of threaded modular connectors may be conductively engaged by the bus bars, the connectors being so shaped to create a weather seal with the block within the openings.

---

The present invention relates to connecting boards and more particularly to a connecting board adapted to permit the attachment of modular connectors thereto.

Conventional forms of connecting boards or junction boxes include a number of receptacles or sockets therein. Mating plugs connected to cables are then inserted within an appropriate receptacle to complete a circuit from the receptacle to the cable. In certain devices, a bus bar is disposed in proximity to the receptacles and wires are connected between the bus bar and receptacle. However, such constructions are limited in flexibility because they require the insertion of one particular fixed type of receptacle in the junction box. Further, such devices are not adapted to withstand the elements of weather. Because the deterioration or burning out of a particular receptacle requires the dismantling of the connecting board, maintenance of such devices becomes costly and time-consuming.

The present invention includes a junction box having modular connectors threadably inserted through the casing of the junction box and into a threaded bore in an embedded bus bar. A stepped diameter recess is formed in the casing of the junction box to communicate with the threaded bore in the bus bar. Also, the modular connector has a matching surface to mate with the casing recess so that when the two become engaged, a weather seal is created. Further, the connectors of the present invention are removable from the bus bar so that if it becomes necessary to replace the same, the connector may be simply unscrewed and replaced by another. The present junction box permits the insertion of male and female connectors, thus permitting installation flexibility. For example, one particular bus bar within the junction box may serve as a source of several tap-offs from a particular power phase.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view illustrating the present junction box with various connectors attached thereto.

FIG. 2 is a vertical cross-sectional view taken along a plane passing through section line 2—2 of FIG. 1.

FIG. 3 is a transverse cross-sectional view taken along a plane passing through section line 3—3 of FIG. 1.

FIG. 4 is a partial vertical sectional view taken along a plane passing through section line 4—4 of FIG. 1.

FIG. 5 is a partially cut away view of a cable first terminal.

FIG. 6 is a partial sectional view taken along a plane passing through section line 4—4 of FIG. 6 illustrating a seated rubber plug.

FIG. 7 is a transverse cross-sectional view taken along a plane passing through section line 7—7 of FIG. 6.

FIG. 8 is a cross-sectional view illustrating the interior elements of a male connector.

Referring specifically to the drawings and more particularly to FIGS. 1 and 2 thereof, the present junction box is denoted by reference numeral 10 and includes a main block portion 12 fabricated from neoprene or the like. The block includes a front panel surface 14, a rearward surface 16, elongated lateral sides 18 extending along the length of the block and transverse ends 20 and 22 disposed perpendicular to the lateral sides 18. The particular illustrated junction box includes four elongated parallel spaced bus bars 24 embedded within block 12 and extending at the ends thereof between ends 20 and 22. FIG. 1 illustrates by way of example four cables 26 extending from the end 20.

As seen in FIG. 2 each cable 26 includes a first end termination with a centrally disposed conductor wire 28 extending inwardly from the end 20 within a bore 30 formed inwardly from the bus bar edge at the end 20. Setscrews 32 are disposed within each bus bar 24 so as to secure each conductor wire 28 within its associated bore 30. Instead of setscrews wire 28 may be crimped within bore 30 by methods well known in the art. During the manufacturing process, the conductor wire is secured within the bus bar and subsequently the dielectric casing is molded therearound. Further, a conical enlargement 33 is molded around the insulation of each cable 26 adjacent end 20.

The opposite transverse end 22 includes four spaced, recesses 36, each recess forming a passage from end 22 to an adjacent edge of a bus bar 24. As clearly shown in FIG. 2, each of these recesses includes a first outwardly communicating cylindrical portion extending to an inwardly tapered frustoconical portion which in turn extends inwardly to a second cylindrical portion having a diameter smaller than that of the outward cylindrical portion. Threaded bores 34 are formed within each bus bar inwardly from the base of each recess 36. A modular, threaded connector, one type being denoted by 38 is inserted within each of the recesses for securement within threaded bore 34. Thus, as seen in FIG. 2, vertical alignment is maintained between each cable 26, associated conductor bar 24 and connector 38.

Considering conductor 38 in detail, a threaded stem 40 integrally mounts an elongated split sleeve tubular portion 46. As shown in FIG. 7, this sleeve is split along three lines to approximately one half the length of the tubular portion. Three concentrically positioned retaining rings 48 engage the circumference of the tubular portion so that it is normally urged to a contracted condition. A neoprene jacket or sleeve 42 is molded around the tubular portion 46. As will be noted, the neoprene jacket end portion 44 adjacent the threaded stem 40 includes a surface contour to conform with the recess 36 so that when connector 38 is threadably inserted within threaded bore 34, a weather seal is created at the interface between recess 36 and mating jacket portion 44. The opposite end of the neoprene jacket includes an inwardly tapering recess 49.

As will be observed from FIG. 1, a male type modular connector denoted by 52 may be inserted, at will, in place of the female type connector 38. Attention is directed to FIG. 8 which specifically shows the construction of the male type connector 52 including a threaded stem 54, an intermediate cylindrical section 56 integrally attached to stem 54, and a cylindrical prong or tip 58 coaxially disposed with intermediate section 56 and extending in a direction opposite threaded stem 54. A neoprene jacket or sleeve 60 covers the intermediate section 56 and a portion of the tip 58. The jacket end portion adjacent the threaded stem 54 has a configuration identical to that of jacket portion 36 of connector 38. An end surface portion 59 on the jacket 60 mates with the tapering recess 49 in connector 38. Longitudinal rib elements 62 are formed around the circumference of each connector jacket 60 as more clearly shown in FIG. 1 to facilitate manipulation of the connector.

Instead of the permanently attached cables 26 shown in FIG. 1, side 20 of block 12 may include recesses 36 such as are formed in side 22. This would permit the insertion of a modular cable termination 52', shown in FIG. 5, within the recesses for electrical contact with the conductor bars 24. This termination is in effect similar to the previously discussed connectors 52 but has one end of a respective cable 26' molded thereto. Specifically, the cable termination includes a threaded stem 54' and recess mating end portion 66. As will be noted, the cable termination shown in FIG. 5 illustrates an optional sealing member or annular projection 64 disposed in outward spaced relation to the end portion 66 so that a superior seal is formed.

In addition to connectors and cables attached along the block ends 20 and 22, a plurality of connection points are provided on the front surface 14 of the dielectric block 12. Referring to FIG. 1, it will be seen that a typical example of the present invention includes four such equally spaced connecting locations 68 arranged in a column along the length of a particular bus bar 24. In the present embodiment, a three phase system is contemplated so that an individual column of connecting locations are included for each phase of power. A fourth column is also included for ground connections and is associated with a fourth bus bar. As seen in FIGS. 2 and 3, each connecting location 68 includes an inwardly bored recess having a cross-section similar to that of aperture 36 shown in FIG. 2 as previously discussed. The outward end of the aperture at 68 communicates with the forward face or surface 14 and the inward end communicates directly with the confronting surface of an associated bus bar 24. A threaded bore 70 is formed coaxially inwardly of conductor bar 24 and in spaced coaxial communicating relationship with aperture 68. Thus, any one of the threaded connectors 38, 52 and 52' aforementioned may be threadably inserted within a recess for electrical connection with an associated threaded bore 70 as shown in FIG. 1.

In order to distinguish each phase column of the junction box, raised indicators are utilized. For example, a first column is designated as ground by the inclusion of a raised tab 72 having appropriate indicia embossed or printed thereon. A second column is designated as the first phase column by the inclusion of a single raised button 74. Likewise, two raised buttons 76 are employed adjacent the third column to designate the second phase connection column and finally, three raised buttons 78 are employed to designate the third phase connection column. Four metal tubular inserts 80 are embedded within the central portion of block 12 and extend outwardly of the forward and rearward faces of the block to permit the passage of fasteners 82 therethrough as shown by dotted line in FIG. 2 to mount the junction box 10 on a wall surface.

FIGS. 1 and 4 illustrate a plug member 84 having a fore-shortened sleeve or jacket portion with raised ribs cylindrically arranged thereon. A threaded stem extends outwardly from the jacket or sleeve portion from an end portion which includes the previously discussed surface configuration mating with recesses 36 or 68. Thus, when a particular connection point is not to be utilized, plug member 84 is screwed therein to keep the connection point weather sealed. A second type of plug 86, clearly shown in FIG. 6, is inserted within a connection point or recess 68 when that particular connection point is not to be used for a protracted period of time. This plug includes a threaded stem portion 88 fabricated from neoprene or the like. A foreshortened cylindrical head portion of the plug is integrally attached to the threaded stem portion and when screwed within a recess 68, a flush fit is effectuated. In order to permit removal of the plug at a later time, a recessed slot 90 is formed within the plug head.

Connection points have not been shown within the rearward face or surface 16. But as will be appreciated, a connection array of phase columns resembling that shown in FIG. 1 or a single transverse row of recesses may be included in this rearward side if so desired. These recesses are adapted to receive threaded connectors 52' shown in FIG. 5. It will also be appreciated that connector blocks with mating connectors of different sizes and numbers may be fabricated in accordance with this invention for different purposes and installations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A connecting board comprising an insulating block, at least one bus bar embedded in the block, a plurality of step-down recesses formed in the face and a first transverse end of the block, the recesses communicating with threaded bores in the bus bars; a cable integrally secured at one end to an oppositely disposed transverse end of the block, a conductor in the cable extending inwardly for internal connection with the bus bar; a connector member for insertion in a recess, the member having an insulative sleeve with an end thereof shaped to conform with the recesses to form a weather-seal therewith, a threaded shank axially secured in the sleeve and extending outwardly from an opposite sleeve end for threaded insertion in a recess, the connector member further having a conductive portion arranged for quick detachable engagement connected to the shank and extending from the weather-seal end; raised projections formed on the block base to identify the phase relation of power in the bus bar; a first threaded recess sealing plug for flush insertion in the block base; a second threaded recess sealing plug having an outwardly extending knurled knob for facilitating insertion and removal in a recess; and mounting holes formed in the block to receive fasteners for securing the flat block back to a mounting surface.

References Cited

UNITED STATES PATENTS

| | | | |
|---|---|---|---|
| 1,943,692 | 1/1934 | Noyes | 317—112X |
| 2,083,379 | 6/1937 | Hill | 317—103 |
| 2,613,287 | 10/1952 | Geiger | 339—18(C)X |
| 2,942,157 | 6/1960 | Davis | 317—119 |
| 3,210,720 | 10/1965 | Harris, Jr. | 339—149 |
| 3,258,730 | 6/1966 | Husband et al. | 339—18(C) |
| 3,325,765 | 6/1967 | Hart et al. | 339—259X |

FOREIGN PATENTS

| | | | |
|---|---|---|---|
| 540,268 | 4/1922 | France | 339—18(C) |
| 894,781 | 4/1962 | Great Britain | 339—22(B) |

MARVIN A. CHAMPION, Primary Examiner

P. A. CLIFFORD, Assistant Examiner

U.S. Cl. X.R.

317—118; 339—17, 113, 259